United States Patent Office 2,952,547
Patented Sept. 13, 1960

2,952,547
SELF-PROPELLING FOOD MIXTURE

Frederick B. Hill, Jr., New Castle, Del., assignor to E. I. du Pont de Nemours and Company, Wilmington, Del., a corporation of Delaware No Drawing. Filed Mar. 20, 1959, Ser. No. 800,648

10 Claims. (Cl. 99—60)

This invention relates to self-propelling foamable food mixtures and more particularly to such mixtures which contain a mixture of gaseous propellants that improve the character of foamed food structures.

Nitrous oxide, carbon dioxide and mixtures thereof are well known propellants for aerosol-dispensible food formulations. An 85/15 mixture of nitrous oxide and carbon dioxide, i.e. 85% by weight of nitrous oxide and 15% by weight of carbon dioxide, has been most widely used, primarily for whipped cream. The foamed food products, obtained with the aid of these conventional propellants, have limited durability, that is, the foams coarsen and then collapse within a relatively short period of time. This coarsening and collapsing of the foamed products is apparently due primarily to loss of the propellant gas or gases by diffusion thereof through the walls of the bubbles, from bubble to bubble, and from bubble to the atmosphere. Ordinarily, such limited foam durability is of little or no import for foods such as whipped cream, which are to be consumed within a short time after their formation. However, such lack of durability of the foamed structure constitutes a serious disadvantage when the product is not meant to be, or may not be, consumed entirely at one sitting or when it is desired to prepare such product several hours before being served and consumed. This is particularly true of such products as cake frostings. It is particularly desirable to have a cake frosting retain its foamed structure until it has had an opportunity to set to a solid (mainly sugar), whereupon it will retain such structure indefinitely. However, when a cake frosting is first produced with the aid of such conventional gas propellants, it will usually have a reasonably desirable creamy appearance, but within a few hours (before it has had an opportunity to harden properly), will collapse to a pasty liquid.

E. G. Young in Patent 2,849,323 has disclosed that perfluorocyclobutane is a most desirable propellant for food formulations, being non-toxic, non-flammable in air, inert to water, and non-corrosive to the metals of the aerosol-dispensing containers. As a liquefied gas propellant, it has many advantages over the conventional gases such as nitrous oxide, carbon dioxide and mixtures thereof. However, perfluorocyclobutane and the mixtures thereof with other polyfluorohydrocarbons, disclosed by Young, are considerably more expensive than nitrous oxide, carbon dioxide and mixtures thereof, and it is frequently desirable to employ a less expensive propellant or mixture of propellants.

It is an object of this invention to provide a self-propelling food mixture which contains a novel combination of propellants. A further object is to provide a self-propelling food mixture in which the main propellant is a cheap gas such as nitrous oxide, carbon dioxide and mixtures thereof and which produces products having better and more durable foamed structures. Other objects are to provide new compositions of matter. Still other objects will appear hereinafter.

The above and other objects may be accomplished by this invention wherein there is provided a self-propelling food mixture confined under pressure in an aerosol-dispensing container, said mixture consisting essentially of an aerosol-dispensible, foamable, edible food formulation and a propellant for said food formulation, which propellant is a mixture of from about 47 to about 15 mole percent of perfluorocyclobutane and from about 53 to about 85 mole percent of a member of the group consisting of nitrous oxide, carbon dioxide and mixtures of nitrous oxide and carbon dioxide.

It has been found that, by employing a minor proportion of perfluorocyclobutane in conjunction with nitrous oxide, carbon dioxide and mixtures thereof in the production of foamed food products, there is obtained an improved foamed structure of greatly improved durability, so that the foamed product can be made many hours prior to the time of its intended consumption, will retain a satisfactory structure for a considerable time if it is not completely consumed at the first sitting, and, in the case of cake frostings and like hardenable products, will retain a satisfactory foam structure until the hardening has taken place and the structure has been stabilized. Such foamed products are very definitely superior in all respects to those made without perfluorocyclobutane, such superiority being clearly apparent by visual observation. Particularly, in cake frosting formulations and the like, they retain an acceptable foam structure while hardening, while those made without the perfluorocyclobutane, collapse comletely well before hardening occurs. These results were not predictable as no method is yet known for predicting the relative effectiveness of different propellants in achieving foam durability. At the same time, the propellant mixtures of this invention, being composed mainly of the cheap propellant gases, are materially less expensive than the propellants disclosed by Young in Patent 2,849,323. While not having all the advantages of the propellants of Young, they are entirely satisfactory for most purposes.

The self-propelling food mixtures of this invention may be prepared in the conventional way by charging an aerosol-dispensing container with an aerosol-dispensible and foamable edible food formulation, then charging said container under a pressure corresponding to about 60 to 100 pounds per square inch gage (p.s.i.g.) at about 70° F., preferably at least about 80 pounds, with the propellant composition. To dispense the food formulation, the valve of the container is opened to release the pressure whereby the contents of the container are expelled under the pressure of the propellant. Preferably, the container is shaken to mix the contents prior to releasing the pressure.

The aerosol container employed is of conventional form and construction well known to the art, particularly those designed for dispensing food formulations.

The aerosol-dispensible food formulations, with which the present invention is concerned, are those designed to have a foamed structure, that is, those self-propelling food formulations which on discharge contain the propellant dispersed therein as a network of supporting bubbles of gas. Dessert toppings, cake frostings and whipped creams are well known examples of such foods whose foamed appearance, including body and texture, is of prime importance to the consumer. These foods may be classed primarily as fat-emulsion based (e.g. whipping cream) or sugar-based (e.g. cake frostings); however, as all contain water as a component, usually emulsified with the organic constituents, they may be considered for the purposes of this invention as aqueous-based foamable food formulations.

The propellant composition of this invention will be composed mainly, from about 53 to about 85 mole percent, of nitrous oxide, carbon dioxide, or a mixture of nitrous oxide and carbon dioxide and preferably from about 53 to about 70 mole percent of those gases. Also, such component of the propellant composition preferably will be the conventional 85/15 mixture of nitrous oxide and carbon dioxide.

The perfluorocyclobutane will constitute from about 15 to about 47 mole percent of the propellant composition, and preferably from about 30 to about 47 mole percent. The perfluorocyclobutane need not exist mainly in the form of a liquefied gas at the temperature at which the food formulation is to be discharged, but may be wholly or largely in the gaseous state. Whether the perfluorocyclobutane exists wholly or partly in the gaseous state will depend upon the total quantity of perfluorocyclobutane in the container, the volume of the free space in the container, and the temperature. Usually, it will be wholly or largely in the gaseous state.

The propellant compositions of this invention will ordinarily be used in quantities providing from about 60 to 100 p.s.i.g. at about 70–72° F. in the conventional aerosol containers. The quantity of perfluorocyclobutane will usually range from about 1% to 5% by weight of the food formulation, and will depend in part on the size of the container, the ratio of the volume of the food formulation to the volume of the container, and on the particular food formulation, i.e. its viscosity and its foaming characteristics.

In order to more clearly illustrate this invention, preferred modes of practicing it, and the advantageous results to be obtained thereby, the following examples are given in which the parts and proportions are by weight except where specifically indicated otherwise.

*Examples*

To 300 parts of a commercial cake frosting, whose exact composition was not determined but which is understood to consist essentially of sugar and dried egg white (or an egg white substitute), was added 235 parts of water, 8 parts of glyceryl monostearate and enough vanilla extract to season, and the mixture was stirred to a creamy consistency.

100 grams of the above cake frosting mix was added to an aerosol can having a capacity of 225 cc., leaving about 115 cc. of free space. The can was then purged of air by perfluorocyclobutane vapor, leaving up to about 1 gram (estimated) of perfluorocyclobutane vapor in the free space. The can was capped with a foam valve, and 4.2 grams (0.021 mole) of perfluorocyclobutane were admitted to the can by means of a conventional pressure loader. The can was then pressurized through the valve with an 85/15 nitrous oxide/carbon dioxide mixture to a total system pressure of about 100±2 p.s.i.g. at 72° F. This required 1.3 grams (0.030 mole) of the $N_2O/CO_2$ mixture, which was added with intermittent shaking of the can until the pressure remained unchanged at 100 p.s.i.g. on further shaking. Therefore, the propellant mixture consisted of between 0.021 and about 0.026 mole of perfluorocyclobutane and 0.030 mole of the $N_2O/CO_2$ mixture, i.e. between 41 and about 46.4 mole percent of perfluorocyclobutane and between about 53.6 and 59 mole percent of the $N_2O/CO_2$ mixture. The thus loaded can was then rolled for 30 minutes, and a portion of its contents discharged at 72° F. into a paper cupcake cup to a volume of about 50 cc. The discharged product was a full-bodied foam having a smooth creamy appearance. Allowed to stand overnight (16 hours) at room temperature, it was judged to have retained very well its full-bodied character and smooth creamy appearance.

It should be noted that in the above system, before discharge, about 65% (0.0137 mole) of the perfluorocyclobutane was in the vapor state at 72° F., as may be calculated from the free space and the vapor pressure of perfluorocyclobutane at 72° F., and about 35% was in the liquid state.

Reducing the quantity of perfluorocyclobutane from 0.021 mole to 0.01 mole (2.0 grams) and to 0.005 mole (1.0 gram), i.e. to about 32.3 mole percent and about 16.4 mole percent respectively (apparently all in the vapor state), gave foamed products which, after standing overnight (16 hours) at room temperature, were judged to have shown fairly good and fair retention of their foam structures, respectively.

In contrast, when the perfluorocyclobutane was omitted in the above experiments and the $N_2O/CO_2$ mixture was used alone as the sole propellant to pressurize the system to 100 p.s.i.g. (1.7 grams or 0.039 mole) or to 150 p.s.i.g. (2.8 grams or 0.064 mole), the discharged product obtained therewith was not as full-bodied in appearance as those obtained by the preceding mixtures, began to coarsen and collapse rapidly, and was a pasty liquid when examined after standing overnight (16 hours) at room temperature.

Substantially identical results were obtained when the above series of experiments were repeated, employing carbon dioxide in place of the $N_2O/CO_2$ mixture.

It will be understood that the preceding examples have been given for illustrative purposes solely and that this invention is not limited to the specific embodiments described therein. On the other hand, it will be readily apparent to those skilled in the art that, subject to the limitations set forth in the general description, variations can be made in the components of the propellent mixtures, in the relative proportions of such components, in the food formulations, and in the proportions of the propellent composition relative to the food formulations without departing from the spirit or scope of this invention.

From the preceding description, it is apparent that this invention provides self-propelling food mixtures of aerosol-dispensible, foamable food formulations and propellent compositions consisting mainly of nitrous oxide, carbon dioxide or mixtures of nitrous oxide and carbon dioxide which produce foamed food products of greatly improved structure and durability. Also, the propellent compositions of this invention are materially less costly than a propellant composed wholly or almost wholly of perfluorocyclobutane. Accordingly, this invention constitutes a valuable advance in and contribution to the art.

The embodiments of the invention in which an exclusive property or privilege is claimed are defined as follows:

1. A self-propelling food mixture confined under pressure in an aerosol-dispensing container, said mixture consisting essentially of an aerosol-dispensible, foamable, edible food formulation and a propellant for said food formulation which propellant is a mixture of from about 47 to about 15 mole percent of perfluorocyclobutane and from about 53 to about 85 mole percent of a member of the group consisting of nitrous oxide, carbon dioxide and mixtures of nitrous oxide and carbon dioxide.

2. A self-propelling food mixture confined under pressure in an aerosol-dispensing container, said mixture consisting essentially of an aerosol-dispensible, foamable, edible food formulation and a propellant for said food formulation which propellant is a mixture of from about 47 to about 30 mole percent of perfluorocyclobutane and from about 53 to about 70 mole percent of a member of the group consisting of nitrous oxide, carbon dioxide and mixtures of nitrous oxide and carbon dioxide.

3. A self-propelling food mixture confined under pressure in an aerosol-dispensing container, said mixture consisting essentially of an aerosol-dispensible, foamable, edible food formulation and a propellant for said food formulation which propellant is a mixture of from about 47 to about 15 mole percent of perfluorocyclobutane and from about 53 to about 85 mole percent of a mixture of nitrous oxide and carbon dioxide.

4. A self-propelling food mixture confined under pressure in an aerosol-dispensing container, said mixture consisting essentially of an aerosol-dispensible, foamable, edible food formulation and a propellant for said food formulation which propellant is a mixture of from about 47 to about 30 mole percent of perfluorocyclobutane and from about 53 to about 70 mole percent of a mixture of nitrous oxide and carbon dioxide.

5. A self-propelling food mixture confined under pressure in an aerosol-dispensing container, said mixture consisting essentially of an aerosol-dispensible, foamable, edible food formulation and a propellant for said food formulation which propellant is a mixture of from about 47 to about 15 mole percent of perfluorocyclobutane and from about 53 to about 85 mole percent of a mixture of 85% by weight of nitrous oxide and 15% by weight of carbon dioxide.

6. A self-propelling food mixture confined under pressure in an aerosol-dispensing container, said mixture consisting essentially of an aerosol-dispensible, foamable, edible food formulation and a propellant for said food formulation which propellant is a mixture of from about 47 to about 30 mole percent of perfluorocyclobutane and from about 53 to about 70 mole percent of a mixture of 85% by weight of nitrous oxide and 15% by weight of carbon dioxide.

7. A self-propelling food mixture confined under pressure in an aerosol-dispensing container, said mixture consisting essentially of an aerosol-dispensible, foamable, cake frosting formulation and a propellant for said formulation which propellant is a mixture of from about 47 to about 15 mole percent of perfluorocyclobutane and from about 53 to about 85 mole percent of a member of the group consisting of nitrous oxide, carbon dioxide and mixtures of nitrous oxide and carbon dioxide.

8. A self-propelling food mixture confined under pressure in an aerosol-dispensing container, said mixture consisting essentially of an aerosol-dispensible, foamable, cake frosting formulation and a propellant for said formulation which propellant is a mixture of from about 47 to about 15 mole percent of perfluorocyclobutane and from about 53 to about 85 mole percent of a mixture of nitrous oxide and carbon dioxide.

9. A self-propelling food mixture confined under pressure in an aerosol-dispensing container, said mixture consisting essentially of an aerosol-dispensible, foamable, cake frosting formulation and a propellant for said formulation which propellant is a mixture of from about 47 to about 15 mole percent of perfluorocyclobutane and from about 53 to about 85 mole percent of a mixture of 85% by weight of nitrous oxide and 15% by weight of carbon dioxide.

10. A self-propelling food mixture confined under pressure in an aerosol-dispensing container, said mixture consisting essentially of an aerosol-dispensible, foamable, cake frosting formulation and a propellant for said formulation which propellant is a mixture of from about 47 to about 30 mole percent of perfluorocyclobutane and from about 53 to about 70 mole percent of a mixture of 85% by weight of nitrous oxide and 15% by weight of carbon dioxide.

References Cited in the file of this patent
UNITED STATES PATENTS

| | | |
|---|---|---|
| 2,435,682 | Getz | Feb. 10, 1948 |
| 2,849,323 | Young | Aug. 26, 1958 |